United States Patent
Iwasaki

(10) Patent No.: US 10,382,703 B2
(45) Date of Patent: Aug. 13, 2019

(54) IMAGING APPARATUS, IMAGE PROCESSING APPARATUS, AND IMAGE PROCESSING METHOD

(71) Applicant: Olympus Corporation, Shibuya-ku, Tokyo (JP)

(72) Inventor: Hiroaki Iwasaki, Hino (JP)

(73) Assignee: Olympus Corporation, Tokyo (JP)

( * ) Notice: Subject to any disclaimer, the term of this patent is extended or adjusted under 35 U.S.C. 154(b) by 574 days.

(21) Appl. No.: 15/064,260

(22) Filed: Mar. 8, 2016

(65) Prior Publication Data

US 2016/0191820 A1 Jun. 30, 2016

Related U.S. Application Data

(63) Continuation of application No. PCT/JP2014/068279, filed on Jul. 9, 2014.

(30) Foreign Application Priority Data

Oct. 2, 2013 (JP) .................................. 2013-207771

(51) Int. Cl.
*G06K 9/46* (2006.01)
*H04N 5/262* (2006.01)
(Continued)

(52) U.S. Cl.
CPC ....... *H04N 5/2625* (2013.01); *H04N 5/23232* (2013.01); *H04N 5/23254* (2013.01);
(Continued)

(58) Field of Classification Search
CPC ............. H04N 5/2625; H04N 5/35536; H04N 5/23232; H04N 5/23254; H04N 5/144; G03B 2217/005; G03B 2205/00
See application file for complete search history.

(56) References Cited

U.S. PATENT DOCUMENTS 9,973,715 B2 * 5/2018 Ajito .................... H04N 5/3572
2011/0285855 A1 * 11/2011 Ota ....................... G01S 3/7864
348/169

(Continued)

FOREIGN PATENT DOCUMENTS

JP 11-313252 11/1999
JP 2003-259184 9/2003
(Continued)

OTHER PUBLICATIONS

International Search Report to International Application No. PCT/JP2014/068279, dated Sep. 9, 2014, (2 pgs.).

*Primary Examiner* — Howard D Brown, Jr.
(74) *Attorney, Agent, or Firm* — John C. Pokotylo; Pokotylo Patent Services

(57) ABSTRACT

An imaging apparatus comprising: a subject recognition section for recognizing a subject image at rest on an imaging surface and a subject image moving on the imaging surface, an image shift-amount detection section for detecting a positional shift on the imaging surface, and an image composition section for executing composition processing by additive composition of the respective image data if the subject recognition section recognizes the subject image as the subject image at rest on the imaging surface and for correcting the positional shift of the moving subject image detected by the image shift-amount detection section if the subject recognition section recognizes the subject image as the subject image moving on the imaging surface and then, for executing the composition processing by relatively bright composition or additionally averaged composition of the respective corrected image data so as to generate taken image data with multiple exposure.

9 Claims, 9 Drawing Sheets

(51) Int. Cl.
 H04N 5/232 (2006.01)
 H04N 5/355 (2011.01)
 H04N 5/14 (2006.01)
(52) U.S. Cl.
 CPC ..... *H04N 5/35536* (2013.01); *G03B 2205/00* (2013.01); *G03B 2217/005* (2013.01); *H04N 5/144* (2013.01)

(56) References Cited

U.S. PATENT DOCUMENTS

| | | | |
|---|---|---|---|
| 2013/0242121 A1 | 9/2013 | Kashiwagi et al. | |
| 2014/0009577 A1* | 1/2014 | Wakabayashi | G01C 3/085 348/43 |
| 2014/0064632 A1* | 3/2014 | Manabe | G06T 5/00 382/254 |
| 2016/0173792 A1* | 6/2016 | Ajito | H04N 5/3572 348/239 |
| 2016/0275375 A1* | 9/2016 | Kant | G06K 9/4604 |

FOREIGN PATENT DOCUMENTS

| | | |
|---|---|---|
| JP | 2007-003662 | 1/2007 |
| JP | 2009-141599 | 6/2009 |
| JP | 2011-114357 | 6/2011 |

* cited by examiner

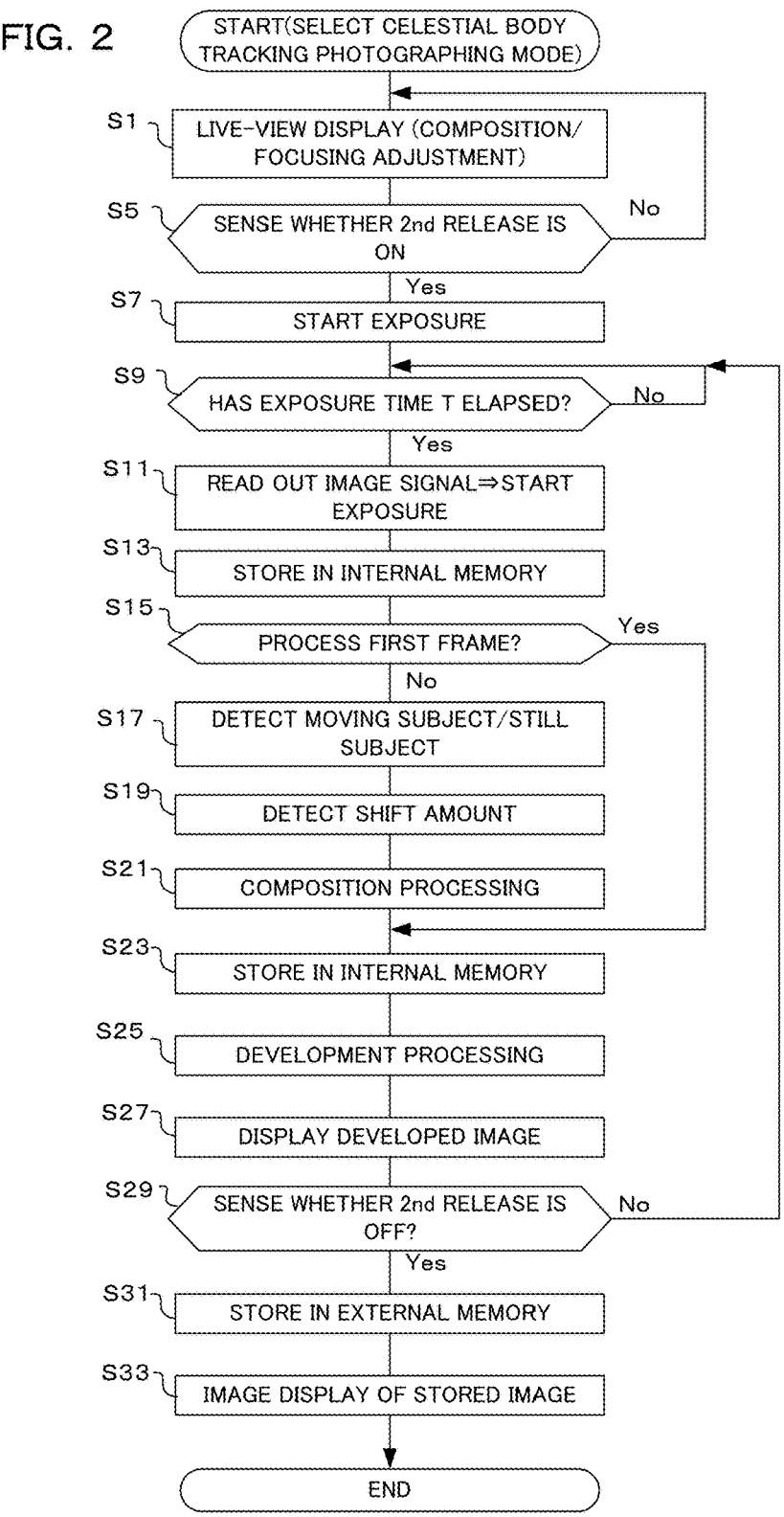

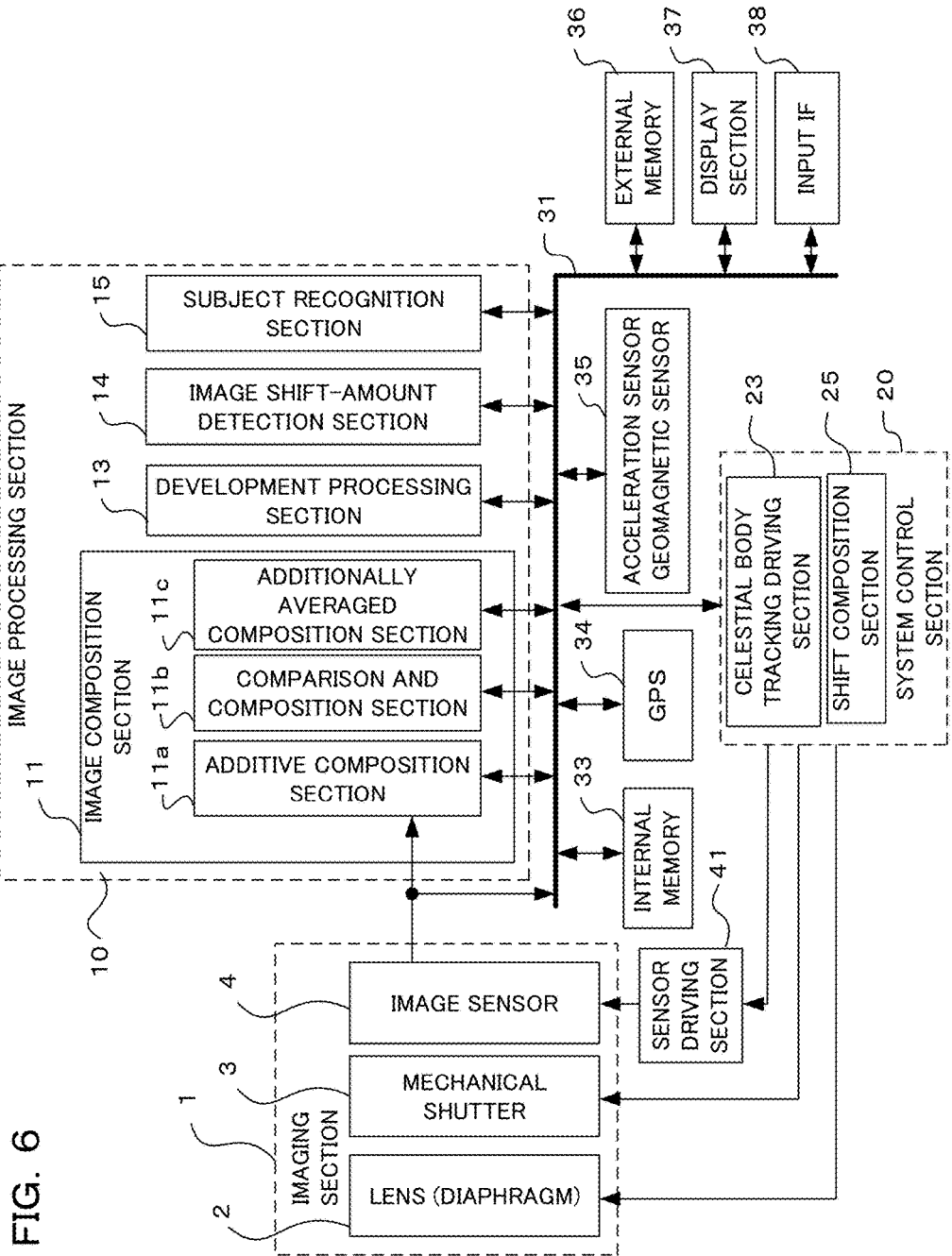

IMAGING APPARATUS, IMAGE PROCESSING APPARATUS, AND IMAGE PROCESSING METHOD

CROSS-REFERENCE TO RELATED APPLICATIONS

This application is a Continuation Application of PCT Application No. PCT/JP2014/068279, filed on Jul. 9, 2014 and based upon and claiming the benefit of priority from prior Japanese Patent Application No. 2013-207771, filed on Oct. 2, 2013, the entire contents of all of which are incorporated herein by reference.

BACKGROUND OF THE INVENTION

1. Field of the Invention

The present invention relates to, in an electronic imaging device such as a digital still camera, an imaging apparatus, an image processing apparatus, and an image processing method which can generate a bulb photography image by image composition and which perform still photographing of a celestial body by moving an image sensor or a camera itself in the same direction as a moving direction of the celestial body by a diurnal motion.

2. Description of Related Art

There have been many photographers who take photos of the celestial body since the age of film cameras before the digital cameras were put on the market. Celestial photographing is frequently performed under long exposure, since subjects are extremely dark except the sun and the moon. If photographing is performed under long exposure with the camera fixed to a tripod or the like, the celestial body moves with the diurnal motion, and an image in which a trajectory of the celestial body flows linearly is obtained. Moreover, for bright ones in the heavenly bodies such as the sun and the moon, photographing can be performed with appropriate exposure without such long exposure for the other dark celestial bodies. However, in the case of photographing using a telephoto lens, since an image surface moving speed of the subject image on the imaging surface (film surface) is fast, the image flows.

Thus, a method is performed in which the camera is mounted on an equatorial telescope moved so as to track in the moving direction of the celestial body, and photographing is performed with the celestial body made still by the equatorial telescope. Moreover, in recent years, an imaging apparatus which can take still photos of the heavenly bodies similarly to the equatorial telescope by causing only an image sensor inside the camera to track in the moving direction of the celestial body while the camera is fixed is proposed (see Japanese Patent Laid-Open No. 2012-5112 (hereinafter referred to as "Patent Literature 1")).

Moreover, an imaging apparatus is also proposed which can generate a composite image equal to the case of taking a still photo of the celestial body by aligning and composing a plurality of images taken in a short exposure time during which movement of the celestial body is not visually recognized (see Japanese Patent Laid-Open No. 2003-259184 (hereinafter referred to as "Patent Literature 2")).

In recent years, photos of a celestial body with a high image quality can be taken easily with a trend to more pixels and higher image quality of the digital camera, and the number of photographers has increased and the subjects to be taken have a wide variety. Among them, a field called "star-scape photo" in which the celestial bodies (sky/stars) and a view on the earth are contained in one photo has been established.

In order to take this star-scape photo, tracking of the celestial bodies by using the equatorial telescope or the imaging apparatus disclosed in Patent Literatures 1 and 2 can be considered. However, in this case, a still photo of the celestial body which is a major subject can be taken but the view on the earth flows. On the other hand, if a photo is taken by fixing the imaging apparatus, the celestial body flows as described above.

Moreover, in the imaging apparatus in Patent Literature 2, the longer the photographing time becomes, the more the subject flows outside a view angle and thus, the view angle of the composite image becomes narrower. A photographing region which has gone out of the view angle in the middle of photographing can be subjected to exposure correction by gain application to an image output by a rear-stage digital circuit. However, in this case, a noise increases by a portion of an applied gain which results in deterioration of an image quality, and a photo with a view angle or an image quality intended by the photographer cannot be taken.

Moreover, for image composition by shifting the plurality of images so that the position of the celestial body becomes the same, positional information of the celestial body needs to be read out of the image, but the celestial body photographing has an extremely dark subject, and the image subjected to divided exposure is darker and can easily become an image with poorer S/N. It is extremely difficult to accurately read out the positional information of the celestial body from such an image, and it is difficult to generate a composite image of a still celestial body with accuracy.

SUMMARY OF THE INVENTION

The present invention has an object to provide an imaging apparatus, an image processing apparatus, and an image processing method which can take a star-scape photo in which both the views of the celestial body and on the earth do not flow.

An imaging apparatus according to a first aspect of the present invention comprising: an imaging section which includes a lens to form a subject image on an imaging surface, and an image sensor to respectively obtain image data in performing a plurality of exposures on the subject image during multiple exposure; a subject recognition section which detects a change in a pixel output at a position having a correspondence relationship with the image data from the respective image data obtained in the plurality of exposures, and recognizes a subject image at rest on the imaging surface and a subject image moving on the imaging surface; an image shift-amount detection section which detects a moving amount and a moving direction of a pixel position in the image data corresponding to a positional shift on the imaging surface with respect to the moving subject image recognized by the subject recognition section; and an image composition section which executes composition processing by additive composition of pixel outputs of the respective image data corresponding to the subject image at rest with respect to the respectively obtained image data in the plurality of exposures if the subject recognition section recognizes the subject as the subject image at rest on the imaging surface, and corrects a pixel position correspondingly to the positional shift of the moving subject image on the basis of the moving amount and the moving direction detected by the image shift-amount detection section with respect to the respectively obtained image data in the plurality of exposures if the subject recognition section recognizes the subject as the subject image moving on the imaging surface, and then executes the composition processing by relatively bright composition or additionally averaged composition of pixel outputs of the respective corrected image data so as to generate taken image data with multiple exposure.

An image processing apparatus according to a second aspect of the present invention comprising: a storage section which stores respective image data obtained by multiple exposure of a subject image in which a subject image at rest on an imaging surface and a subject image moving on the imaging surface are mixed, in a plurality of exposures during the multiple exposure; a subject recognition section which analyzes the respectively obtained image data in the plurality of exposures, to detect a change in an pixel output at a position having a correspondence relationship with the image data, and to recognize the subject image at rest on the imaging surface and the subject image moving on the imaging surface; an image shift-amount detection section which detects a moving amount and a moving direction of a pixel position in the image data corresponding to a positional shift on the imaging surface with respect to the moving subject image recognized by the subject recognition section; and an image composition section which executes composition processing by additive composition of pixel outputs of the respective image data corresponding to the subject image at rest if the subject recognition section recognizes the subject as the subject image at rest on the imaging surface, and corrects a pixel position corresponding to the positional shift of the moving subject image on the basis of the moving amount and the moving direction detected by the image shift-amount detection section with respect to the respectively obtained image data in the plurality of exposures if the subject recognition section recognizes the subject as the subject image moving on the imaging surface, and then executes the composition processing by relatively bright composition or additionally averaged composition of pixel outputs of the respective corrected image data so as to generate taken image data with multiple exposure.

An image processing method according to a third aspect of the present invention comprising: a step of storing respective image data obtained by multiple exposure of a subject image in which a subject image at rest on an imaging surface and a subject image moving on the imaging surface are mixed, in a plurality of exposures during the multiple exposure; a subject recognition step of detecting a change in an pixel output at a position having a correspondence relationship with the image data from the respective image data obtained with the multiple exposure, to recognize the subject image at rest on the imaging surface and the subject image moving on the imaging surface; an image shift-amount detection step of detecting a moving amount and a moving direction of a pixel position in the image data corresponding to a positional shift on the imaging surface with respect to the moving subject image recognized in the subject recognition step; and an image composition step of executing composition processing by additive composition of the respective image data with respect to the respectively obtained image data in the plurality of exposures if the subject is recognized as the subject image at rest on the imaging surface in the subject recognition step, and correcting a pixel position corresponding to the positional shift of the moving subject image on the basis of the moving amount and the moving direction detected in the image shift-amount detection section if the subject is recognized as the subject image moving on the imaging surface in the subject recognition step, and then executing the composition processing by relatively bright composition or additionally averaged composition of pixel outputs of the respective corrected image data so as to generate taken image data with multiple exposure.

BRIEF DESCRIPTION OF THE DRAWINGS

FIG. 2 is a flowchart illustrating an operation when a celestial body tracking photographing mode is selected in the camera according to the first embodiment of the present invention.

FIG. 6 is a block diagram mainly illustrating an electric configuration of a camera according to a second embodiment of the present invention.

DETAILED DESCRIPTION OF THE PREFERRED EMBODIMENTS

A preferred embodiment will be described below by using a camera to which the present invention is applied in accordance with the attached drawings. The camera according to the preferred embodiment of the present invention is a digital camera and in summary, it performs live-view display, on the display section, of image data based on image data read out of an image sensor (image sensor 4) and stores the image data which is image-processed for storage in an external memory in accordance with an operation of a release button. Moreover, when a celestial body tracking photographing mode is set, the image data is read out of the image sensor at a predetermined time interval, and a composite image obtained by adding the image data is generated. When this composite image is to be generated, a positional shift of a moving subject image is corrected so that the views of the celestial body and on the earth do not flow.

Figure 1:
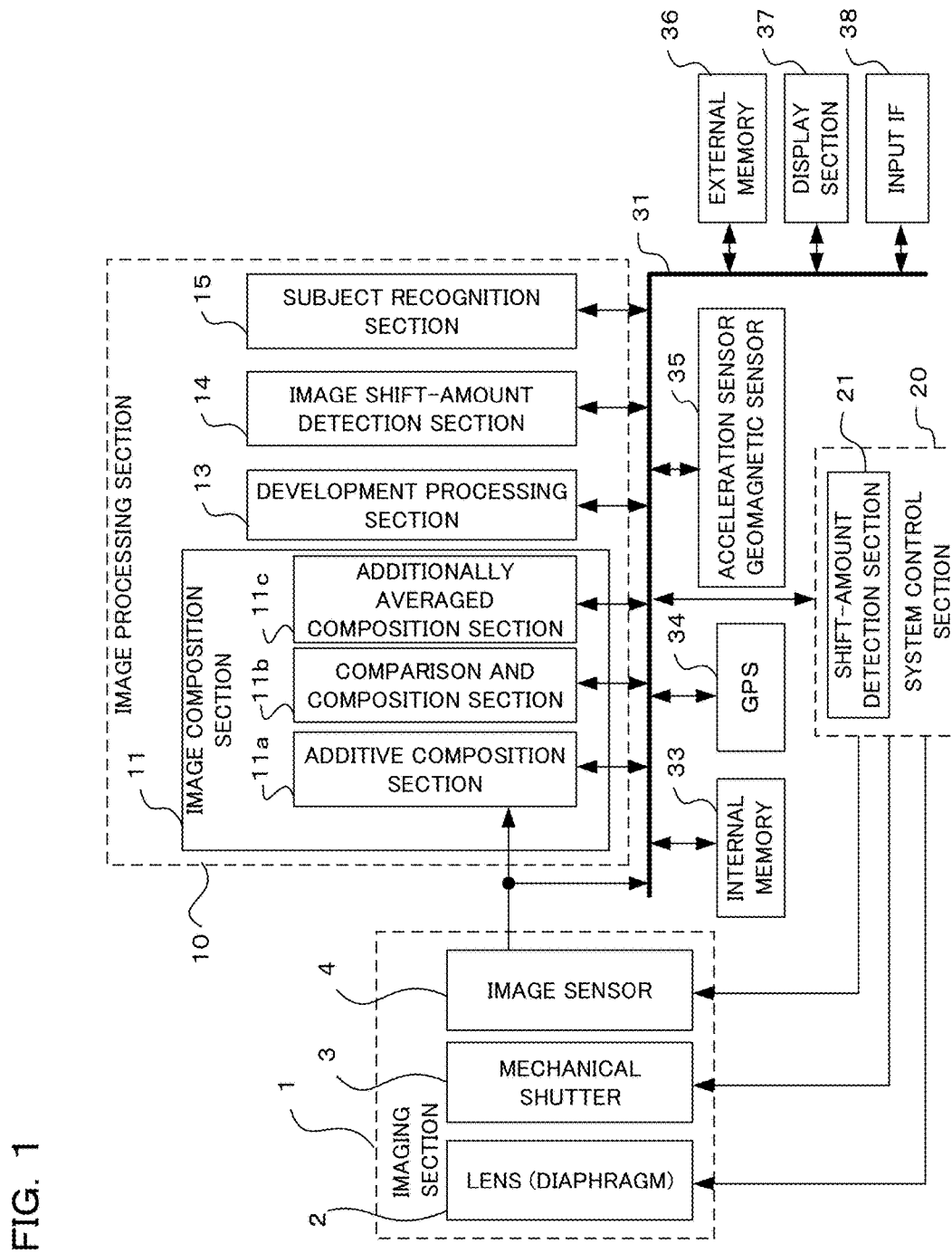
FIG. 1 is a block diagram mainly illustrating an electric configuration of a camera according to a first embodiment of the present invention.

FIG. 1 is a block diagram mainly illustrating an electric configuration of the camera according to a first embodiment as the preferred embodiment of the present invention. The camera in this embodiment has an imaging section 1, an image processing section 10, a system control section 20, and a bus 31 and each portion connected to the bus 31. In this embodiment, a lens 2 is constituted integrally with a camera body but may be a replaceable lens.

In the imaging section 1, the lens 2, a mechanical shutter 3, and an image sensor 4 are provided. The lens 2 forms an optical image of the subject on the image sensor 4. In this lens 2, a diaphragm determining an aperture value for adjusting an exposure amount is provided. Moreover, the mechanical shutter 3 exposes or shields light to the image sensor 4 by an opening and closing operation and controls shutter speed.

The image sensor 4 includes an image sensor such as a CMOS image sensor or a CCD image sensor, converts an optical image of the subject formed by the lens 2 to an electric signal for each pixel and outputs the image data to the image processing section 10 and the bus 31. The bus 31 is a signal line for transmitting/receiving signals between respective blocks. The imaging section 1 functions, in this embodiment, as an imaging section for multiply exposing a subject image in which a subject image at rest on an imaging surface and a subject image moving on the imaging surface are mixed.

The image processing section 10 applies image processing to the image data output from the image sensor 4. The image processing section 10 has an image composition section 11, a development processing section 13, an image shift-amount detection section 14, and a subject recognition section 15. A function of each portion in the image processing section 10 may be realized by a hardware circuit, may be realized by a circuit executed by a program code such as DSP (Digital Signal Processor) or may be realized by a CPU (Central Processing Unit) and a peripheral circuit as well as a program code.

The image composition section 11 reads out the image data from the image sensor 4 at the predetermined time interval and generates a composite image obtained by adding this image data. This image composition section 11 has an additive composition section 11a, a comparison and composition section 11b, and an additionally averaged composition section 11c.

The additive composition section 11a adds an image continuously read out of the image sensor 4 at the predetermined time interval or an output of each pixel of the image data stored in an internal memory 33. Though details will be described by using FIG. 2, if the release button is operated when the celestial body tracking photographing mode is set, an image signal is read out at each predetermined time interval (exposure time T at S9 in FIG. 2) and thus, the additive composition section 11a carries out cumulative addition for each pixel.

The comparison and composition section 11b compares the pixel outputs and generates a composite image by relatively bright composition processing and relatively dark composition processing. In the relatively bright composition processing, the pixel data constituting the image data read out of the image sensor 4 at first is stored in the internal memory 33 as the relatively bright composite image data. Subsequently, for the pixel data constituting the image data read out of the image sensor 4 and a plurality of pieces of pixel data constituting the cumulative relatively bright composite image data stored in the internal memory 33, the corresponding pixel data are compared, respectively. Then, in accordance with a result of comparison of the respective corresponding pixel data, the pixel data of the larger one, that is, the brighter one is detected and by using this brighter pixel data, the cumulative relatively bright composite image data is reconstructed. This processing is repeatedly executed each time the image data is read out of the image sensor 4.

This relatively bright composition processing is composition processing in which the corresponding pixel outputs in the image data read out at the predetermined time interval are compared and replaced by brighter pixels in accordance with the comparison result in summary. In the aforementioned additive composition processing, the pixel output is added each time it is read out but in the relatively bright composition processing, the pixel output is replaced when the bright pixel output is read out as the result of comparison, while if the bright pixel output is not read out as the result of comparison, the pixel output is not replaced, which is a difference.

The additionally averaged composition section 11c calculates an average output of each pixel and executes image averaging composition processing. In the case of a dark subject such as a celestial body photo, it is easily influenced by a noise superposed on the pixel output but by calculating the average output of each pixel, the influence of the noise can be reduced.

The development processing section 13 applies development processing such as demosaicing, white balance adjustment, gamma correction, and image compression to RAW image data generated by the image composition section 11.

The image shift-amount detection section 14, for a moving subject, detects how many pixels the subject has moved on the image. In this embodiment, since photographing is performed with the camera fixed in the celestial body tracking photographing mode, the view on the earth does not flow even under long exposure, but since stars or the like move, the view of them flows. Thus, the image shift-amount detection section 14 calculates how many pixels a moving star or the like has moved on the image. This calculation will be described later by using FIG. 3A (for details, see image P2).

The subject recognition section 15 analyzes a plurality of pieces of taken image data and recognizes a moving subject and a still subject. The subject recognition section 15 detects a change of a pixel output at a position with a correspondence relation of the image data obtained at the predetermined time interval, and if there is a change, it is recognized as a moving subject, and if there is no change, it is recognized as a still subject. Other than that, whether the subject is a moving subject or a still subject may be recognized by recognizing a shape of the subject whether it has a star shape or the like, for example.

The image processing section 10 functions as an image processing section for generating image data representing an image without a positional shift by correcting the positional shift of the moving subject image in images obtained by multiple exposure by collaborating with the system control section 20, which will be described later. Details will be described by using steps S9 to S21 in FIG. 2 and FIG. 3 and the like.

To the bus 31, in addition to the aforementioned image processing section 10, the internal memory 33, a GPS (Global Positioning System) 34, a sensor 35, an external memory 36, a display section 37, an input IF (Interface) 38, and the system control section 20 are connected.

The internal memory 33 temporarily stores various setting information required in a camera operation and the image data currently being processed at the time of image processing. The internal memory 33 is constituted by a non-volatile memory such as a flash memory and a volatile memory such as an SDRAM.

In the GPS 34, a GPS receiver receives a radio wave from a satellite and measures at what position on the earth the camera is located, and in this embodiment, it obtains latitude information. The sensor section 35 includes an acceleration sensor and a geomagnetic sensor. The acceleration sensor detects a gravity direction of the fixed camera and detects to what direction the camera is directed with respect to the gravity. The geomagnetic sensor detects to what direction of north, south, east, and west the camera is directed.

As will be described later, when the celestial body tracking photographing mode is set, a moving direction and a moving amount (collectively called a shift amount) of a moving subject such as a star is detected by the image shift-amount detection section 14. However, since the celestial body is extremely dark, detection of the shift amount is difficult. Thus, the shift amount of the subject such as a star may be calculated by obtaining the latitude information where the camera is present from the GPS 34 and by obtaining to what direction it is directed from the sensor section 35.

The external memory 36 is a non-volatile storage medium detachably loaded in the camera body or fixed to an inside thereof and is an SD card, a CF card or the like, for example. This external memory 36 stores the image data developed by the development processing section 13 and at the time of playback, the stored image data is read out and can be output to the outside of the camera. The external memory 36 functions as a storage section for storing the image data obtained by multiply exposing the subject image in which the subject image at rest on the imaging surface and the subject image moving on the imaging surface are mixed.

The display section 37 is constituted by a rear-surface display section such as TFT (Thin Film Transistor) liquid crystal or an organic EL or an EVF (electronic viewfinder) and displays an image developed by the development processing section 13.

The input IF 38 has an operation member such as a release button and a touch panel or the like for inputting a touch operation in the rear-surface display section or the like and gives instructions such as various mode setting and a photographing operation such as release on the basis of a user operation.

The system control section 20 has a CPU (Central Processing Unit) and executes entire control of the camera in accordance with a program stored in the internal memory 33. Moreover, the system control section has a shift-amount detection section 21. The shift-amount detection section 21 calculates a shift amount of a celestial body image formed on an image surface of the image sensor 4 on the basis of movement information detected by the GPS 34, azimuth information of the camera detected by the acceleration sensor and the geomagnetic sensor in the sensor section 35, and focal length information of the lens 2 at the time of photographing. The shift-amount detection section 21 may execute processing by software or may execute processing by hardware. Sensing of the shift amount will be described later by using FIG. 3A.

Subsequently, by using a flowchart illustrated in FIG. 2, an operation of the camera according to this embodiment will be described. This flowchart is executed by control of each portion by the system control section 20 in accordance with the program stored in the internal memory 33. This flow represents only operation when the user sets the celestial body tracking photographing mode by the input IF 38, and the other photographing modes are omitted (the same applies to flowcharts illustrated in FIGS. 6 and 7 which will be described later).

Entering the flow illustrated in FIG. 2, first, live-view display is performed (S1). At this step, on the basis of the image data from the image sensor 4, the live-view display is performed on the display section 37. Once the live-view display is performed, the user confirms the live-view image (or a subject image by an optical finder) and adjusts a direction of the camera and a focal length (zoom) or focusing of the lens 2 so that an image of a subject to be taken can be captured. Moreover, the user sets photographing information such as a position of a focusing lens constituting the lens 2, an aperture value, ISO sensitivity and the like through the input IF section 38 such as an operation button or the touch panel as necessary.

Moreover, if the celestial body tracking photographing mode is set, a desired composite image data is obtained by composing the image data read out of the image sensor 4 at the predetermined time interval (see S9), and a cycle T for this reading-out can be set by the user before or during the live-view display. If a setting operation of the cycle T is not performed, initial setting is reflected. The image data read out at the predetermined time interval is called elapsed image data, and the image displayed at step S27 is called an elapsed image.

At step S1, the live-view display is performed and then, whether a 2nd release switch is on or not is determined (S5). When the composition or focusing is adequate, the user presses down the release button in order to start photographing and thus, at this step, it is determined whether the 2nd release switch interlocking with the release button is on or not. If it is not on as the result of determination, the process returns to step S1 to repeatedly performed the live-view display.

As the result of the determination at step S5, if the 2nd release switch is on, the system control section 20 starts exposure of a first frame (S7). At this step, the image sensor 4 starts exposure, that is, starts accumulation of image signals in accordance with brightness of the subject image by controlling the mechanical shutter 3 and the image sensor 4. Moreover, a time-counting operation of a timer for counting the exposure time is started.

When exposure is started, then, it is determined whether exposure time T has elapsed or not (S9). Here, it is determined whether the elapsed time of the timer which started the time-counting operation at step S7 has elapsed T or not. As the result of this determination, if the exposure time T has not elapsed, elapse of the exposure time T is awaited while the exposure is continued.

As the result of the determination at step S9, if the exposure time T has elapsed, the image signal is read out, and the exposure is resumed (S11). Here, the system control section 20 reads out the image signal (also called elapsed image data) out of the image sensor 4 and starts the exposure again. At this resumption of the exposure, the mechanical shutter 3 is kept open, and accumulation of the image signals is resumed by electronic shutter control of the image sensor 4. Moreover, a timer for counting the exposure time is reset, and the time-counting operation is resumed.

Moreover, at step S11, the image signal is read out and then, stored in the internal memory (S13). At this step, the image signal read out of the image sensor 4 is stored as digital image data in the internal memory 33. When reading-out is completed at the same time as storing of the image data in the internal memory 33, exposure of the subsequent frame is started without a time gap.

Thus, exposure falling between images taken in continuously can be minimized, and loss of light trails of the final composite image can be minimized. Since the CMOS image sensor used in general as an image sensor of the digital camera can read out per line and sequentially control exposure start, time of exposure falling between continuous frames becomes approximately readout time for one line. This time is as extremely small as approximately several tens to hundred microseconds and the image is not visually recognized as an image with loss of light trails.

At step S13, when the image signal is stored in the internal memory, then, it is determined whether it is processing of the first frame or not (S15). The composition processing in the celestial body tracking photographing mode is executed after the image data of the second frame is obtained and thus, it is determined whether it is time of obtaining the image data of the first frame or time of obtaining the image data of the second frame and after. As the result of the determination at step S15, if it is the processing of the first frame, the process proceeds to step S23, and the composition processing is not executed.

As the result of determination at step S15, if it is not the processing of the first frame, then, detection of the moving subject/still subject is performed (S17). At this step, the image data in two frames continuously read out are compared by the subject recognition section 15, and the moving subject and the still subject included in the image data are detected. This processing is not executed for the image data in the first frame. Details of this subject recognition will be described later by using FIGS. 3A to 3C.

Once the moving subject/still subject detection is performed, then, shift-amount detection is performed (S19). Here, for the moving subject detected at step S17, the image shift-amount detection section 14 detects a shift amount between images in the continuous two frames. In this embodiment, since the celestial body such as a star is the moving subject, the shift amount is sensed for each of the stars. That is, the shift-amount detection section 21 compares the moving subjects included in the image data in the respective two frames and detects for how many pixels and in what direction they have shifted on the image. This processing is not executed for the image data in the first frame. Details of this shift-amount detection will be described later by using FIGS. 3A to 3C.

Once shift-amount detection is performed, then, composition processing is executed (S21). Here, the image composition section 11 applies the different image processing for each of the still subject portion and the moving subject portion. First, for the still subject portion, the additive composition section 11a applies addition processing for the image data with the same coordinate of each of the image data in the first frame and the second frame. For the moving subject portion, the coordinate is shifted only by the shift amount detected by the image shift-amount detection section 14, and the first frame and the second frame are overlapped with each other and then, the additive composition section 11a executes the addition processing.

Once the composition processing is executed, then, it is stored in the internal memory (S23). Here, the image data subjected to the composition processing at step S21 is stored in the internal memory 33. For the image composition for the third frame and after, since the cumulative composite images so far are stored in the internal memory 33, the image data of the composite image is generated at steps S17 to S21 by using the image data of this cumulative composite image and the image data read out at the third frame and after. Therefore, for the image in the N-th frame (an integer of 3 or more), the image data of the composite image is generated using the composite image of the first to N−1-th frames and the image data of the read-out image of the N-th frame.

Once it is stored in the internal memory, then, development processing is performed (S25). Here, to the image data stored in the internal memory 33 (image data of the first frame or the image data of the composite image), the development processing section 13 applies development processing such as the demosaicing processing, the y-correction processing, noise-reduction processing, YC signal generation processing, resizing processing and the like. The resizing processing is executed in order to make the number of pixels of the image signal read out of the image sensor 4 match the number of display pixels of a display monitor since the number of image pixels is larger than the display pixels of the display monitor of the display section 37.

Once the development processing is executed, then, a developed image is displayed (S27). Here, the image (elapsed image) based on the image data developed at step S25 is displayed on the display section 37. At step S9, each time the exposure time T has elapsed, the composition-processed image is displayed as an exposure elapsed image and thus, the user can confirm the image on which exposure gradually progresses by long exposure.

Once the development display is performed, then, whether the 2nd release has been turned off or not (S29) is sensed. If the user sets the celestial body tracking photographing mode and starts photographing by pressing on the release button at step S5 and then, finishes the photographing, the user releases pressing on the release button. Then, at this step, it is determined whether or not the release switch has been turned off. As the result of this determination, if it has not been turned off (in the case of on), the process returns to step S9, the timer is reset at step S11 and then, when the time T has elapsed after the reset, the processing at steps S17 to S27 is executed.

As the result of determination at step S29, if turning-off of the 2nd release switch is sensed, then, it is stored in the external memory (S31). Here, the image data of the cumulative composite image is stored as the finally taken image in the external memory 36. Moreover, image display of the stored image is performed (S33). Here, the taken image stored in the external memory 36 is displayed on the display section 37. When the stored image is displayed, the operation in the celestial body tracking photographing mode is finished.

As described above, in the flowchart illustrated in FIG. 2, the image data obtained by multiply exposing the subject image in which the subject image at rest on the imaging surface and the subject image moving on the imaging surface are mixed is read out (S11), this read-out image data is processed and a positional shift of the moving subject image is corrected so as to generate image data without a positional shift (S19, S21), and this corrected image data is stored in the external memory (S31). Moreover, when the positional shift of the subject image is to be corrected, a shift amount of the moving subject image is detected, and correction is made by using this shift amount. Moreover, each time the corrected image data is generated, it is displayed on the display section 37 (S27).

Subsequently, by using FIGS. 3A to 3C, detection of the moving subject performed by the subject recognition section 15 at step S17 will be described. When photographing is performed by fixing the camera on a tripod or the like, a star photographed on an image of each of the frames continuously read out becomes a point image as illustrated in an image P1 in FIG. 3A. If the exposure time is made longer so as to gain sufficient brightness, in these images, since the stars move by diurnal motion, images of only the star portions flow as illustrated in FIG. 3B. This movement of the stars is enlarged and illustrated as an image P2 in FIG. 3A. The images of the stars are shifted between the N-th frame and the N+1-th frame.

Here, a method of detecting a moving subject from images in the N-th and N+1-th frames performed by the subject recognition section 15 will be described. An absolute value of a difference between outputs of each of the pixels in the N-th frame and the N+1-th frame is calculated, and if the absolute value is a predetermined threshold value or more, it is determined that the moving subject is photographed in the pixel.

Specifically, assuming that an address of a pixel in each image is (x, y), N(x, y) is a pixel output at a coordinate (x, y) of the N-th frame, and the threshold value is TH, in the case of the following:

$$ABS(N(x,y)-N+1(x,y)) \leq TH \quad (1)$$

the pixel (x, y) is a still subject portion.

in the case of the following:

$$ABS(N(x,y)-N+1(x,y)) > TH \quad (2)$$

the pixel (x, y) is determined to be a moving subject portion. The term ABS( ) indicates a formula for calculating an absolute value.

In the aforementioned formulas (1) and (2), the threshold value TH is provided for the following reason. Since a random noise is generated in the image sensor 4, an output of the same image is fluctuated by the random noise at each reading-out even if photographing is performed with the same exposure, and the threshold value TH is provided in order to prevent misrecognition as a moving subject due to the fluctuation in the pixel output caused by this random noise.

Figure 3A:
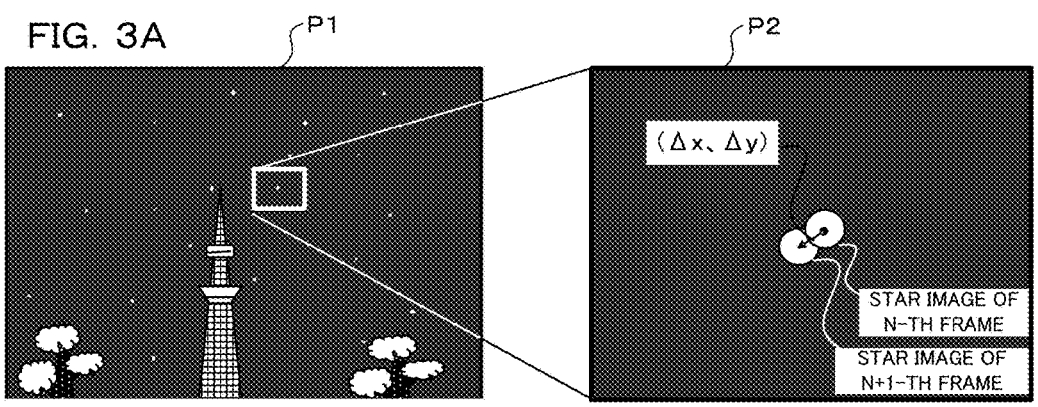
FIGS. 3A to 3C are views for explaining detection of a shift amount for executing shift composition in the camera according to the first embodiment of the present invention.
Figure 3B:

As described above, by means of the determination on the basis of the differential output of the pixel outputs, since the pixel portion on which the star image is formed as illustrated in the image P2 in FIG. 3A exceeds the threshold value TH, it is determined to be a moving subject portion, while the other portions are determined to be a still subject.

Moreover, as illustrated in the image P2 in FIG. 3A, a shift amount ($\Delta x$, $\Delta y$) can be detected from a positional relation of the star images in the N-th frame and the N+1-th frame. This detection of the shift amount is performed by the image shift-amount detection section 14 at step S19.

Subsequently, the composition processing executed by the additive composition section 11a at step S21 will be described. As described above, the composition processing is different between the moving subject portion and the still subject portion. A case of composition in which the composite image data N+1_com (x, y) is combined with the read-out image data N (x, y) of the N+1-th frame will be described.

Regarding a pixel region on which an image of the still subject portion is formed, it is assumed to be as follows:

$$N+1\_com(x,y)=N+1(x,y)+N\_com(x,y) \quad (3)$$

regarding a pixel region on which an image of the moving subject portion is formed, since it is composed by shifting the coordinate by the shift amount ($\Delta x$, $\Delta y$), it is assumed to be as follows:

$$N+1\_com(x,y)=N+1(x-\Delta x, y-\Delta y)+N\_com(x,y) \quad (4)$$

Figure 3C:

As described above, by executing the composition processing separately for the still subject portion and the moving subject portion, as illustrated in FIG. 3C, neither of the background or the star images flows but a sufficiently bright composite image can be obtained.

Subsequently, the subject recognition section 15 and a variation of this embodiment will be described by using FIG. 4. In the celestial body photographing, since the subject is extremely dark, a case in which an image output read out as a read-out image of each frame is expected to be extremely small. In this case, when the moving subject is detected from the difference in the image outputs as described above, a sufficiently large value cannot be obtained for the differential output in some cases, and detection accuracy may be deteriorated.

In such a case, the moving subject portion and the still subject portion may be separated from each other by the user's operation. For example, as illustrated in FIG. 4, while the user confirms the live-view image before photographing, the user performs a touch operation on the touch panel which is one of the input IF 38 so as to indicate the background portion (still subject portion) or the celestial body portion (moving subject portion).

Figure 4:
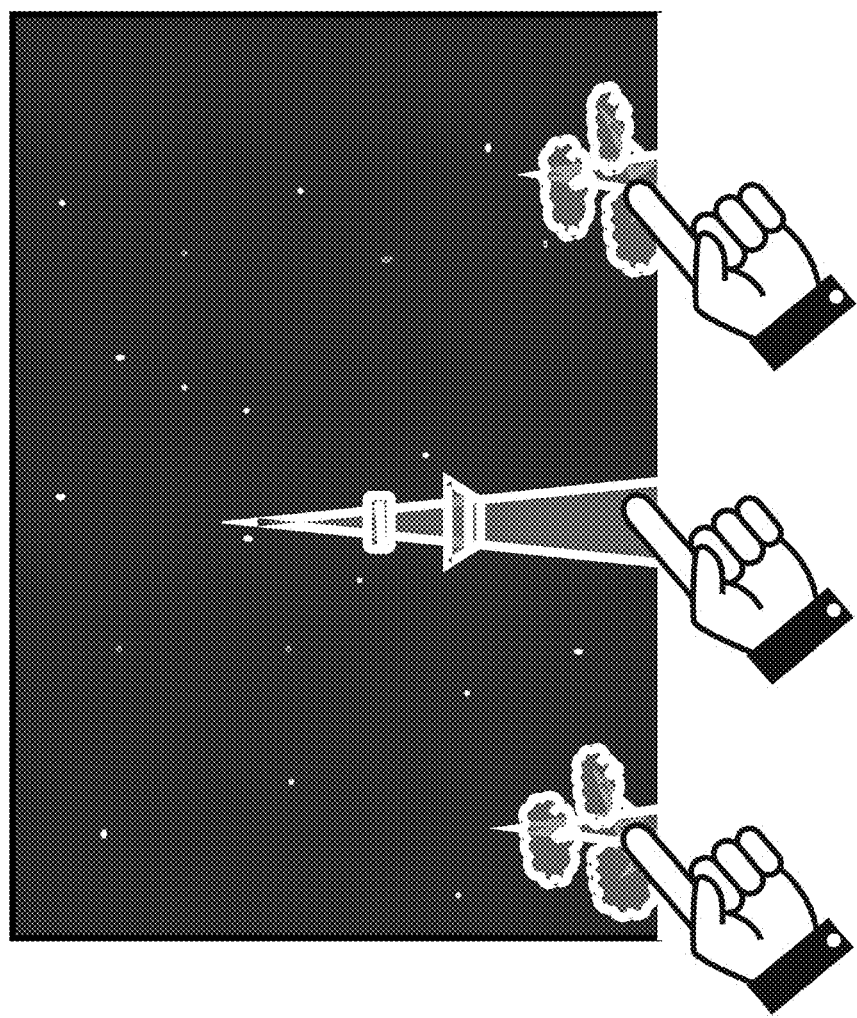
FIG. 4 is a view for explaining an example of how to indicate a background portion in the camera according to the first embodiment of the present invention.

In the example illustrated in FIG. 4, the user indicates the background portion by touching it (still subject portion). The live-view image in this case allows the user to easily confirm the image by using an image taken with sufficient exposure in pre exposure. Moreover, the background portion or the celestial body portion may be indicated by a touch operation using, for example, a pen type input device, other than the touch panel, or by operating a cursor with a cross button or the like.

Figure 5A:
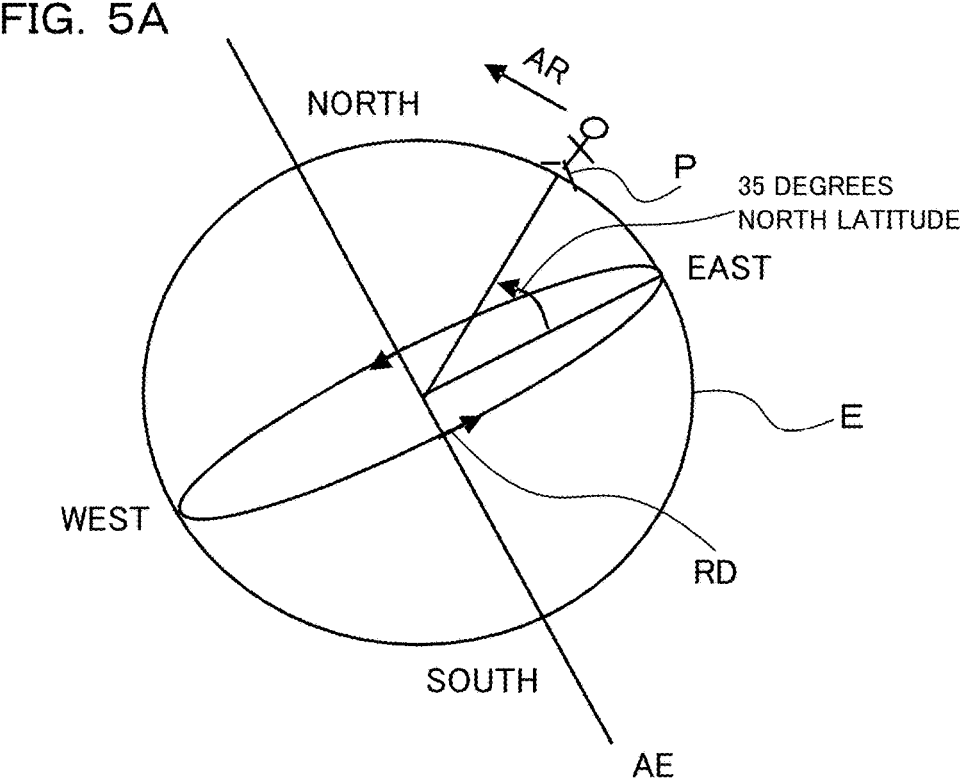
FIGS. 5A and 5B are views for explaining an example for detecting the shift amount in the camera according to the first embodiment of the present invention.
Figure 5B:
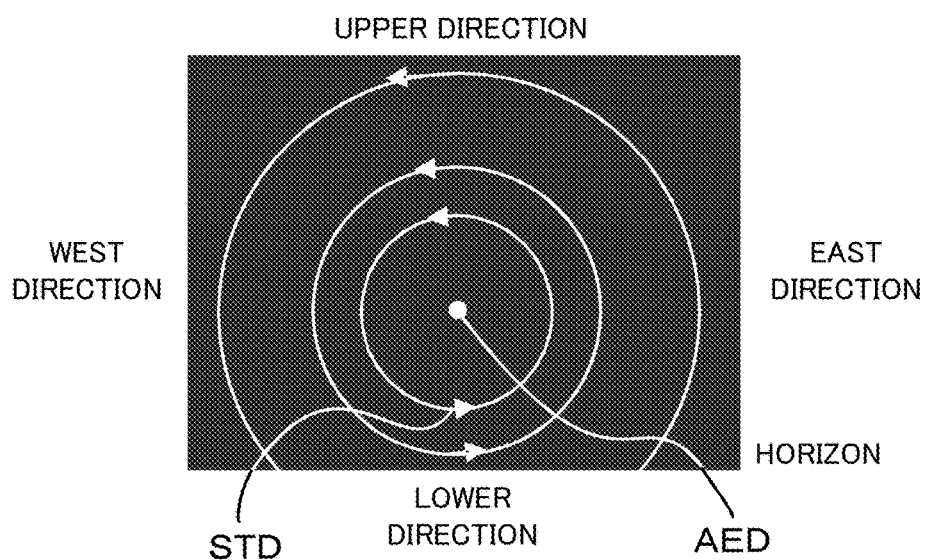

Subsequently, the shift-amount detection section 21 will be described by using FIGS. 5A and 5B. As described above, in the celestial body photographing, the subject is extremely dark and thus, the image output read out as a read-out image of each frame is extremely small, and detection of the shift amount ($\Delta x$, $\Delta y$) is expected to be also difficult. In this case, by detecting latitude information of the camera and information on what direction the camera is directed, a moving direction of a star can be predicted, whereby the moving direction and a moving amount (shift amount) can be predicted.

The celestial body looks as if it is moving with rotation of the earth. FIG. 5A illustrates the earth E in the cosmic space, and the earth E rotates around the earth's axis AE (rotating axis of rotation) as a rotation center in the rotating direction RD. That is, the earth E rotates by 15 degrees per hour in the right rotating direction with respect to the north direction of the earth's axis.

The celestial body looks as if it rotates in a direction opposite to the rotating direction of the earth E when seen from the earth. FIG. 5B illustrates a moving direction of the celestial body when the north direction is seen from a point P (Tokyo in Japan, for example). That is, Tokyo is located in the vicinity of 35 degrees north latitude, and when the camera is directed to the north direction (field of view AR) as illustrated in FIG. 5A, the celestial body rotates by 15 degrees per hour toward a moving direction STD with the direction of the earth's axis AED as a rotation center as illustrated in FIG. 5B.

As described above, if a photographing view angle determined by the latitude information of the camera, the azimuth of the camera (direction with respect to the gravity direction, azimuth of north, south, east or west), and the focal length of the lens is known, by what amount and in what direction the celestial body moves on the image data can be predicted (this moving direction and the moving amount are called a shift amount). The latitude information can be sensed by mounting the GPS 34, the direction with respect to the gravity direction by the acceleration sensor of the sensor section 35, and the azimuth by the geomagnetic sensor of the sensor section 35.

As described above, in the first embodiment of the present invention, since photographing is performed by fixing the imaging apparatus, the background portion becomes a still subject image, the celestial body portion becomes a moving subject image, and the image data in which the still subject image and the moving subject image are mixed is output from the imaging section (image sensor 4) at the predetermined time interval. The image processing section (including the image processing section 10 and the shift-amount detection section 21) senses the shift amount of the moving subject image (see S19 in FIG. 2 and the image P2 in FIG. 3A) and corrects the positional shift of the subject image by using this sensed shift amount so as to generate the image data representing the image without a positional shift (see S21 in FIG. 2 and FIG. 3C).

The method of indicating either one of (or both of) the background portion (still subject image) and the celestial body (moving subject image) is described in FIG. 4, but if the still subject and the moving subject can be sufficiently recognized by the subject recognition section 15, it may be omitted. Moreover, the method of predicting the shift amount by sensing the latitude information and the azimuth information of the imaging apparatus is described in FIG. 5, but if the shift amount can be sufficiently sensed by the image shift-amount detection section 14, it may be omitted.

Subsequently, by using FIGS. 6, 8 and 9, a second embodiment of the present invention will be described. In the first embodiment, since the celestial body is photographed by fixing the camera, the celestial body such as a star becomes a moving subject, while the background portion becomes a still subject. On the other hand, in the second embodiment, the image sensor 4 in the camera tracks and photographs the celestial body and thus, the celestial body such as a star becomes a still subject and the background portion becomes a moving subject.

Configuration of this embodiment will be described by using FIG. 6. The camera according to the second embodiment differs from that according to the first embodiment in that it has a sensor driving section 41 for mechanically driving the image sensor 4 and also has a celestial body tracking driving section 23 and a shift composition section 25 in the system control section 20.

The sensor driving section 41 has a driving mechanism capable of driving in three axis directions, that is, translation directions (x, y) in parallel with an image forming surface of the image sensor 4 and a rotating direction. Moreover, the celestial body tracking driving section 23 calculates a moving direction of the celestial body by using the latitude information, the azimuth direction, and the focal length information obtained from the GPS 34 described as a variation of the first embodiment, the acceleration sensor and the geomagnetic sensor in the sensor section 35 and movement information of the celestial body (shift amount, (x, y)) calculated from the output of the image sensor 4. Then, on the basis of this calculation result, the sensor driving section 41 is driven/controlled so that the image sensor 4 can track movement of the celestial body. In this embodiment, the sensor driving section 41 and the celestial body tracking driving section 23 function as a tracking section for tracking the moving subject by shifting the image sensor (image sensor 4), and the imaging section 1 functions as an imaging section for performing multiple exposure by tracking the moving subject by the tracking section.

The shift composition section 25 corrects a positional shift of the subject image by using the moving amount of the celestial body in the moving direction calculated by the celestial body tracking driving section 23 for the moving subject image recognized by the subject recognition section 15 and generates the image data representing an image without a positional shift of the subject image. That is, in this embodiment, the positional shift of the moving subject image is corrected on the basis of the shift information of the image sensor (image sensor 4).

Since those other than each of the sections described above have functions similar to each of the sections illustrated in FIG. 1, detailed description will be omitted.

Subsequently, by using a flowchart illustrated in FIG. 8, an operation of the camera according to this embodiment will be described. This flowchart has steps S2 to S4 added to the flowchart illustrated in FIG. 2, and only calculation of the shift amount and the composition processing at steps S19 and 21 are different, while the processing at the other steps are similar. Thus, different steps will be mainly described.

Figure 8:
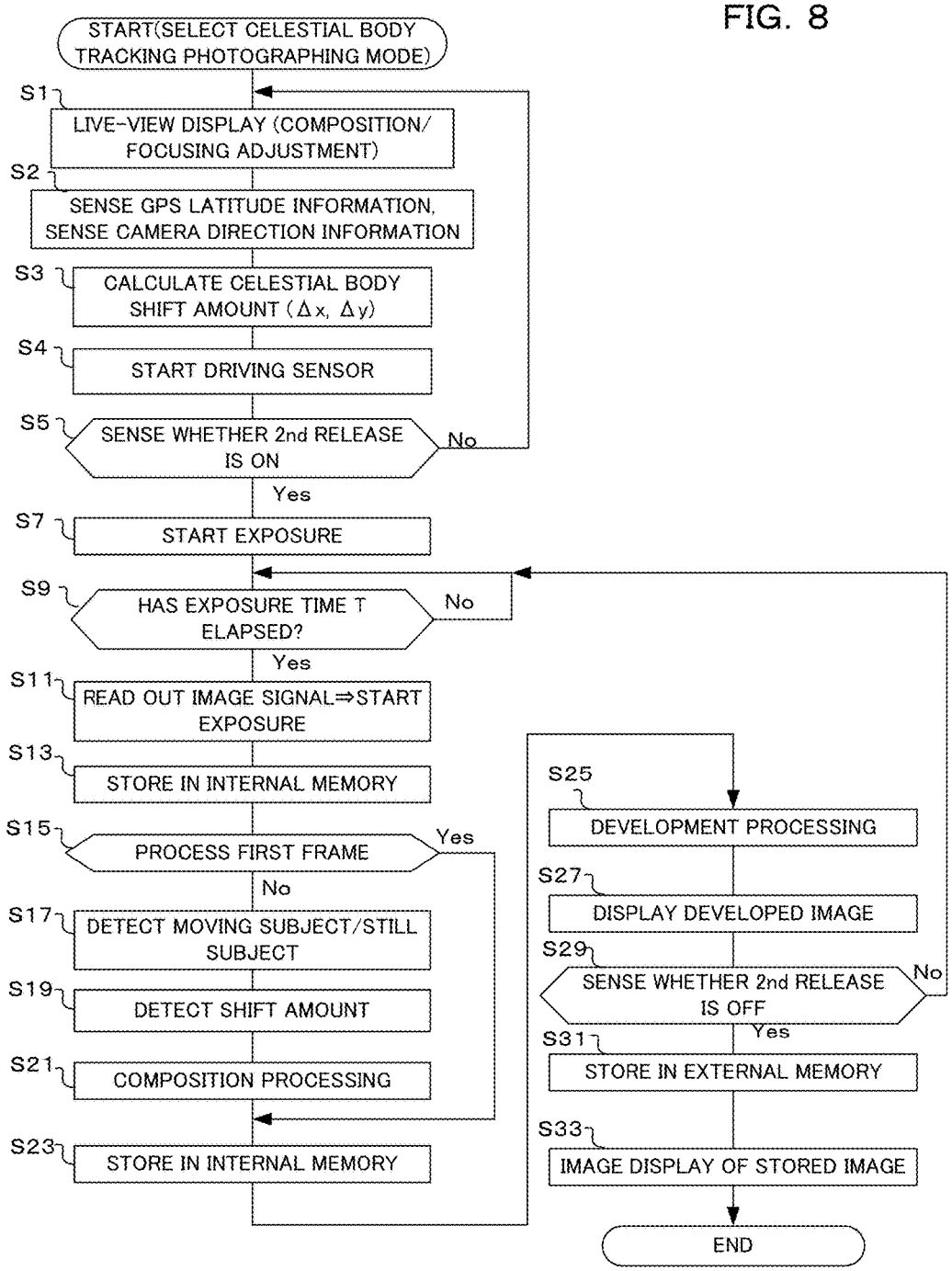
FIG. 8 is a flowchart illustrating an operation when a celestial body tracking photographing mode is selected in the camera according to the second embodiment of the present invention.

Entering the flow illustrated in FIG. 8, first, the live-view display is performed (S1). Once the live-view display is performed, GPS latitude information sensing and camera direction information sensing are performed (S2). Here, the latitude information is detected by the GPS 34, and the azimuth of the camera (direction to the gravity, azimuth information of north, south, east, and west) is detected by the acceleration sensor and the geomagnetic sensor in the sensor 35.

Subsequently, the celestial body shift amount ($\Delta x$, $\Delta y$) is calculated (S3). Here, on the basis of the latitude information and the camera direction information as well as the focal length information detected at step S2, the shift amount of the celestial body (the moving direction and the moving amount ($\Delta x$, $\Delta y$) of the celestial body) is calculated as described by using FIG. 5.

Once the celestial body shift amount is calculated, then, sensor driving is started (S4). Here, on the basis of the celestial body shift amount calculated at step S3, the celestial body tracking driving section 23 starts driving of the image sensor 4 so as to track the celestial body by the sensor driving section 41. This sensor driving is continuously performed from start of photographing to the end.

Once the sensor driving is started, then, it is determined whether the 2nd release has been turned on or not (S5). Since the processing from this steps S5 to step S17 is similar to the processing in the flowchart illustrated in FIG. 2, detailed description will be omitted.

At step S17, once detection of the moving subject and the still subject is performed, then, a shift amount is detected (S19). In the first embodiment, the shift-amount detection section 21 detects the shift amount by comparing the moving subjects included in the image data of the respective two frames and by detecting how many pixels and in what direction they are shifted on the image. On the other hand, in the second embodiment, since the image sensor 4 is shifted by the celestial body shift amount ($\Delta x$, $\Delta y$) calculated at step S3, in the shift-amount detection at step S19, the celestial body shift amount ($\Delta x$, $\Delta y$) calculated at step S3 is used.

Once the shift-amount detection is performed at step S19, then, composition processing is executed (S21). In the composition processing according to the first embodiment, the celestial body is the moving subject and the background is the still subject, while in the second embodiment, to the contrary, the celestial body is a still subject and the background is a moving subject. Therefore, the second embodiment corrects a positional shift by using the shift amount detected at step S19 for the background portion which is the moving subject, so as to generate the image data without a positional shift. A detailed operation of this composition processing will be described later by using FIGS. 9A to 9C.

Once the composition processing is executed, then, it is stored in the internal memory but since the processing from steps S21 to S33 is the same as in the flowchart illustrated in FIG. 2, detailed description will be omitted. At step S33, once the stored image is displayed, the operation in the celestial body tracking photographing mode in this embodiment is finished.

Figure 9A:
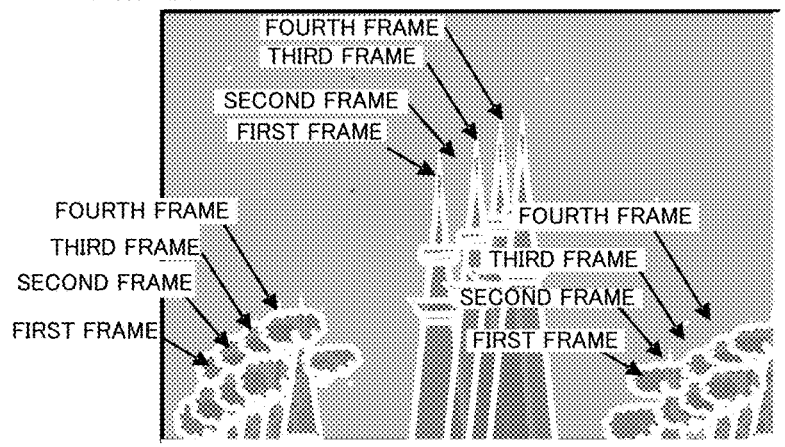
FIGS. 9A to 9C are views for explaining image composition during celestial body tracking photographing in the camera according to the second embodiment of the present invention.
Figure 9B:
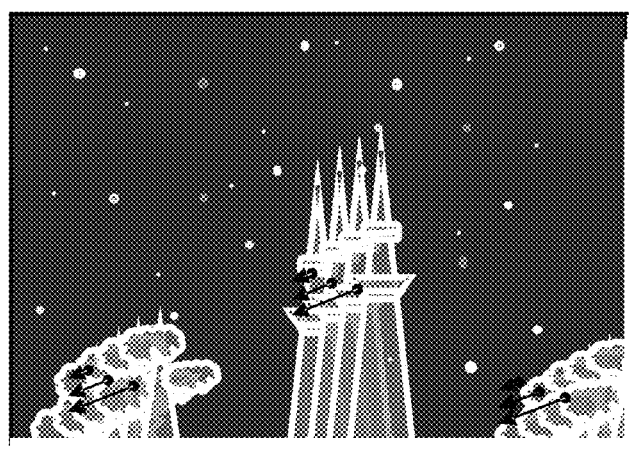
Figure 9C:

Subsequently, by using FIGS. 9A to 9C, the composition processing in this embodiment will be described. FIG. 9A illustrates an image of only the background portion obtained at the predetermined time interval, FIG. 9B illustrates an image obtained by simple multiple composition of images of the background portion and the celestial body portion obtained at the predetermined time interval, and FIG. 9C illustrates an image after the shift composition.

In the second embodiment, as illustrated in FIG. 9A, the background portion in the image in each of the frames is moving. Thus, for the background portion detected by the subject recognition section 15, an image shifted for each of the obtained frames is obtained (respective shift amounts are illustrated in FIG. 9B). Since the celestial body tracking by image-sensor shift is performed in this embodiment, the background is shifted in a direction opposite to the driving direction of the image sensor 4 and thus, the shift amount at this time of the background is (−Δx, −Δy) with respect to the shift amount (Δx, Δy) of the image sensor 4.

As described above, in the second embodiment of the present invention, since photographing is performed while the image sensor 4 of the imaging apparatus is shifted so as to track the celestial body, the background portion becomes the moving subject image, the celestial body portion becomes the still subject image, and the image data in which the still subject image and the moving subject image are mixed is output from the imaging section (image sensor 4) at the predetermined time interval. The image processing section (including the image processing section 10, the celestial body tracking driving section 23, and the shift composition section 25) calculates the shift amount on the basis of the latitude information and the azimuth information of the camera and the focal length information of the lens (see S3 and S19 in FIG. 8 and FIG. 5), corrects a positional shift of the subject image by using this calculated shift amount and generates image data representing an image without a positional shift (see S21 in FIG. 8 and FIGS. 9B and 9C).

In the first embodiment, the celestial body moves and the background is stationary, but in the second embodiment, the celestial body is stationary, and the background moves. In star-scape photographing, the celestial body is usually assumed to be a major subject, and in the first embodiment, since the celestial body moves, the celestial body which is the major subject goes out of the screen during the photographing. On the other hand, in this embodiment, since the celestial body which is the major subject is stationary, the celestial body does not go out of the view angle during the photographing. Thus, photographing can be performed with a view angle according to the composition determined by the user before the photographing, and the photographing according to the intention of the user is made possible.

Figure 7:
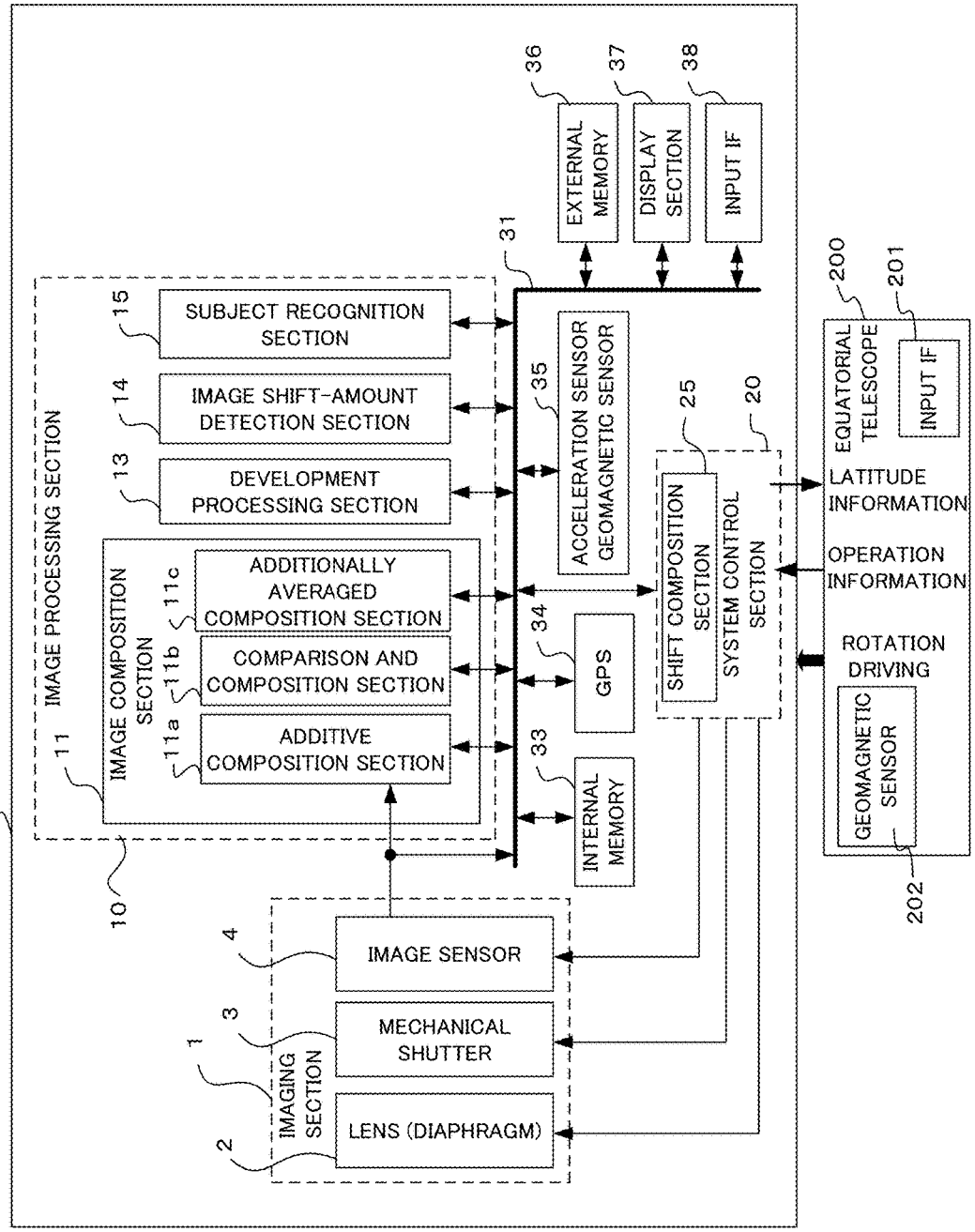
FIG. 7 is a block diagram mainly illustrating an electric configuration of a camera according to a variation of the second embodiment of the present invention.

Subsequently, by using FIG. 7, a variation of the second embodiment will be described. In the second embodiment, the image sensor 4 itself is moved as the celestial body tracking section so as to track the celestial body, but in this variation, a camera 100 is fixed to an equatorial telescope 200 and it is constituted such that the entire camera 100 tracks the celestial body by the equatorial telescope 200.

Specifically, the equatorial telescope 200 is installed on a tripod or the like, and the camera 100 is installed on a rotating stage of the equatorial telescope 200. Moreover, in the equatorial telescope 200, rotational driving for tracking the celestial body is applied (applied through the aforementioned rotating stage) to the camera 100, and operation information such as turning on/off of the operation is transmitted to the camera 100, while the latitude information is transmitted from the camera 100. The equatorial telescope 200 incorporates a geomagnetic sensor 202 and detects the azimuth information of the equatorial telescope. Moreover, on the basis of the latitude information from the camera 100, inclination of a rotating axis can be adjusted so as to be the same direction as the earth's axis. Moreover, an input IF 201 is provided on the equatorial telescope 200, and various settings can be made. In this variation, the equatorial telescope 200 functions as the tracking section for tracking the subject by shifting the entire imaging apparatus.

The camera 100 and the equatorial telescope 200 in this variation operate similarly to the operation of the second embodiment illustrated in FIGS. 8 and 9A to 9C. However, in the flowchart illustrated in FIG. 8, calculation of the celestial body shift amount at step S3 and sensor driving at step S4 are not performed. Instead, a motion of the camera 100 by the equatorial telescope 200 is detected by the acceleration sensor and the geomagnetic sensor of the sensor section 35, a shift amount is calculated on the basis of the motion detected at step S19, and the image composition is performed on the basis of the shift amount calculated at step S21.

As described above, in the variation of the second embodiment of the present invention, it is constituted such that the entire imaging apparatus is shifted as the tracking section so as to track the subject, and by using the latitude information, the azimuth information, the direction to the gravity direction, the focal length, and driving information of the driving device for shifting the imaging apparatus during photographing of the imaging apparatus, a positional shift amount of the moving subject image is calculated, and the positional shift is corrected by using this calculated positional shift amount.

Subsequently, a variation of the first and second embodiments will be described. In a star-scape photo, exposure of the background portion is brighter than the celestial body portion in many cases. Thus, with the composition method by additive composition in the first and second embodiments, if photographing is performed so that exposure is appropriate at the celestial body portion, the background portion is overexposed in many cases. Moreover, with the additive composition, since a reading-out noise generated in reading-out from the image sensor 4 is integrated, the more the number of times of additive composition becomes, the more the image quality of the composite image deteriorates.

Thus, it is preferable that different composition methods are used for the moving subject and the still subject such as additive composition for the composition method of the celestial body portion, and additionally averaged composition by the additionally averaged composition section 11c or the relatively bright composition by the comparison and composition section 11b for the composition method of the background portion. That is, in this variation, additive composition is used for the still subject image and for the moving subject, the positional shift is corrected and then, the relatively bright composition or additionally averaged composition is used for composition.

In this variation, the user manually makes setting so that exposure of the background becomes appropriate in the exposure time T or automatic setting is made by using an automatic exposure detection function of the camera. Since the composition method of the background portion is performed by additionally averaged composition or relatively bright composition, even if photographing is continued for the exposure time T or longer, exposure of the background portion is maintained appropriately. It is only necessary for the user to finish the photographing when the exposure of the dark celestial body portion becomes appropriate while checking progress of photographing on the display section 37 so that photographing intended by the user can be performed with appropriate exposure for each of the celestial body and the background.

In the case of the relatively bright composition, exposure is kept constant, and a noise does not increase as compared with the additive composition. Moreover, in the case of the additionally averaged composition, exposure is kept constant and a random noise component in the read-out noise is averaged and thus, the more the number of composite images increases, the more the noise generated in the composite image decreases, and the image quality is improved, whereby the image quality of the background portion is improved as compared with the additive composition.

As described above, in each of the embodiments and the variations of the present invention, in the imaging apparatus for performing multiple composition of the image signals continuously read out of the image sensor 4 to generate a bulb photography image, when the subject image in which the subject image at rest on the imaging surface and the moving subject image are mixed is to be imaged, the positional shift of the moving subject image is corrected, and the image data representing an image without a positional shift is generated. Thus, a star-scape photo in which neither of the celestial body or the view on the earth flows can be taken.

Moreover, in the second embodiment and the variation of the present invention, the tracking section for tracking the moving subject is provided, and multiple exposure is performed while the moving subject is tracked by this tracking section. Thus, even if the exposure time is long, the celestial body which is the major subject can be imaged with the same view angle.

Moreover, in the second embodiment and the variation of the present invention, if tracking by the image sensor shifting is to be performed (see FIG. 6), by correcting the moving amount of the subject from the shift information of the image sensor, a composite image with the positional shift accurately corrected can be obtained. Moreover, in photographing with the equatorial telescope in which the imaging apparatus itself is shifted (see FIG. 7), by calculating the positional shift from the latitude information, the azimuth information, the direction to the gravity direction, and the information of the focal length of the imaging apparatus and by correcting the moving amount of the moving subject from the obtained positional shift amount, a composite image with the positional shift accurately corrected can be obtained. Thus, even if the exposure time is long, the celestial body which is the major subject can be imaged with the same view angle.

In each of the embodiments and the variation of the present invention, photographing is started by pressing on the release button and the photographing is stopped by releasing the pressing, but that is not limiting, and naturally, it may be so constituted that photographing is started by pressing on the release button and the photographing is continued even after the pressing is released once the photographing is started and the photographing is stopped by pressing on the release button again.

Moreover, in each of the embodiments and the variation of the present invention, the image is read out at every exposure time T during photographing, but this exposure time T may be a certain period of time or may be changed as appropriate. Moreover, in each of the embodiments and the variation of the present invention, the major subject is a celestial body such as a star, but that is not limiting and naturally, it may be other subjects.

Moreover, in each of the embodiments and the variation of the present invention, each time the image data is read out of the image sensor 4 at the predetermined time interval, the position of the moving subject image is corrected on the basis of the shift amount, and the image data without a positional shift is generated. However, that is not limiting, and it may be so configured that all the image data read out at the predetermined time interval is stored and after the photographing is finished, the positional shift of the subject image is corrected. In this case, the positional shift of the moving subject image cannot be corrected in displaying the progress of bulb photographing, but the positional shift can be corrected for the finally stored image.

Moreover, in the embodiment and the variation of the present invention, description is given by using a digital camera as a device for photographing, but a digital single-lens reflex camera or a compact digital camera may be used as a camera, a camera for a moving picture such as a video camera or a movie camera may be also used and moreover, it may be a camera incorporated in a mobile phone, a smart phone, a PDA (Personal Digital Assist), a game device or the like. In any case, the present invention can be applied to any device as long as it performs long exposure and reads out image data from an imaging section at the predetermined time interval and generates image data by executing composition processing.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodi-

What is claimed is:

1. An imaging apparatus comprising:
an imaging section which includes a lens to form a subject image on an imaging surface, and an image sensor to respectively obtain image data in performing a plurality of exposures on the subject image during multiple exposure; and
at least one processor for image processing having a subject recognition section, an image shift-amount detection section, and image composition section, that executes instructions for implementing operations in each section as follows:
the subject recognition section which detects a change in a pixel output at a position having a correspondence relationship with the image data from the respective image data obtained in the plurality of exposures, and recognizes a subject image at rest on the imaging surface and a subject image moving on the imaging surface;
the image shift-amount detection section which detects a moving amount and a moving direction of a pixel position in the image data corresponding to a positional shift on the imaging surface with respect to the moving subject image recognized by the subject recognition section; and
the image composition section which
executes composition processing by additive composition of pixel outputs of the respective image data corresponding to the subject image at rest with respect to the respectively obtained image data in the plurality of exposures if the subject recognition section recognizes the subject as the subject image at rest on the imaging surface, and
corrects a pixel position correspondingly to the positional shift of the moving subject image on the basis of the moving amount and the moving direction detected by the image shift-amount detection section with respect to the respectively obtained image data in the plurality of exposures if the subject recognition section recognizes the subject as the subject image moving on the imaging surface, and then executes the composition processing by relatively bright composition or additionally averaged composition of pixel outputs of the respective corrected image data so as to generate taken image data with multiple exposure.

2. The imaging apparatus according to claim 1, wherein the image shift-amount detection section detects the number of pixels having moved by the change in position from the corresponding image data with respect to the moving subject image recognized by the subject recognition section, to detect the movement amount and moving direction which cause the positional shift on the imaging surface.

3. The imaging apparatus according to claim 1, wherein the at least one processor further comprises
a tracking section including a drive apparatus to track a moving subject, wherein
the imaging section executes the multiple exposure while tracking the moving subject by driving the drive apparatus.

4. The imaging apparatus according to claim 3, wherein the drive apparatus tracks the subject by shifting the entire imaging apparatus.

5. The imaging apparatus according to claim 4, further comprising a position sensor to detect latitude information of the imaging apparatus in photographing and a direction sensor to detect direction information of the imaging apparatus in the photographing and a direction to a gravity direction, wherein
the image shift-amount detection section calculates a positional shift amount of the moving subject image using the latitude information, the direction information, the direction to the gravity direction, focal length of the lens, and drive information of the drive apparatus, and
the image composition section corrects pixel positions in the image data corresponding to the positional shift amount using the calculated positional shift amount.

6. The imaging apparatus according to claim 3, wherein the drive apparatus tracks the subject by shifting the image sensor.

7. The imaging apparatus according to claim 6, wherein the image composition section corrects the pixel position corresponding to the positional shift of the moving subject image according to shift information of the image sensor.

8. An image processing apparatus, comprising:
a memory section which stores respective image data obtained by multiple exposure of a subject image in which a subject image at rest on an imaging surface and a subject image moving on the imaging surface are mixed, in a plurality of exposures during the multiple exposure; and
at least one processor for image processing having a subject recognition section, an image shift-amount detection section, and image composition section, that executes instructions for implementing operations in each section as follows:
the subject recognition section which analyzes the respectively obtained image data in the plurality of exposures, to detect a change in an pixel output at a position having a correspondence relationship with the image data, and to recognize the subject image at rest on the imaging surface and the subject image moving on the imaging surface;
the image shift-amount detection section which detects a moving amount and a moving direction of a pixel position in the image data corresponding to a positional shift on the imaging surface with respect to the moving subject image recognized by the subject recognition section; and
the image composition section which executes composition processing by additive composition of pixel outputs of the respective image data corresponding to the subject image at rest if the subject recognition section recognizes the subject as the subject image at rest on the imaging surface, and corrects a pixel position corresponding to the positional shift of the moving subject image on the basis of the moving amount and the moving direction detected by the image shift-amount detection section with respect to the respectively obtained image data in the plurality of exposures if the subject recognition section recognizes the subject as the subject image moving on the imaging surface, and then executes the composition processing by relatively bright composition or additionally averaged composition of pixel outputs of the respective corrected image data so as to generate taken image data with multiple exposure.

9. An image processing method comprising:

storing respective image data obtained by multiple exposure of a subject image in which a subject image at rest on an imaging surface and a subject image moving on the imaging surface are mixed, in a plurality of exposures during the multiple exposure;

detecting a change in an pixel output at a position having a correspondence relationship with the image data from the respective image data obtained with the multiple exposure, to recognize the subject image at rest on the imaging surface and the subject image moving on the imaging surface;

detecting a moving amount and a moving direction of a pixel position in the image data corresponding to a positional shift on the imaging surface with respect to the moving subject image recognized; and executing composition processing by additive composition of the respective image data with respect to the respectively obtained image data in the plurality of exposures if the subject is recognized as the subject image at rest on the imaging surface, and correcting a pixel position corresponding to the positional shift of the moving subject image on the basis of the moving amount and the moving direction detected if the subject is recognized as the subject image moving on the imaging surface, and then executing the composition processing by relatively bright composition or additionally averaged composition of pixel outputs of the respective corrected image data so as to generate taken image data with multiple exposure.

* * * * *